UNITED STATES PATENT OFFICE.

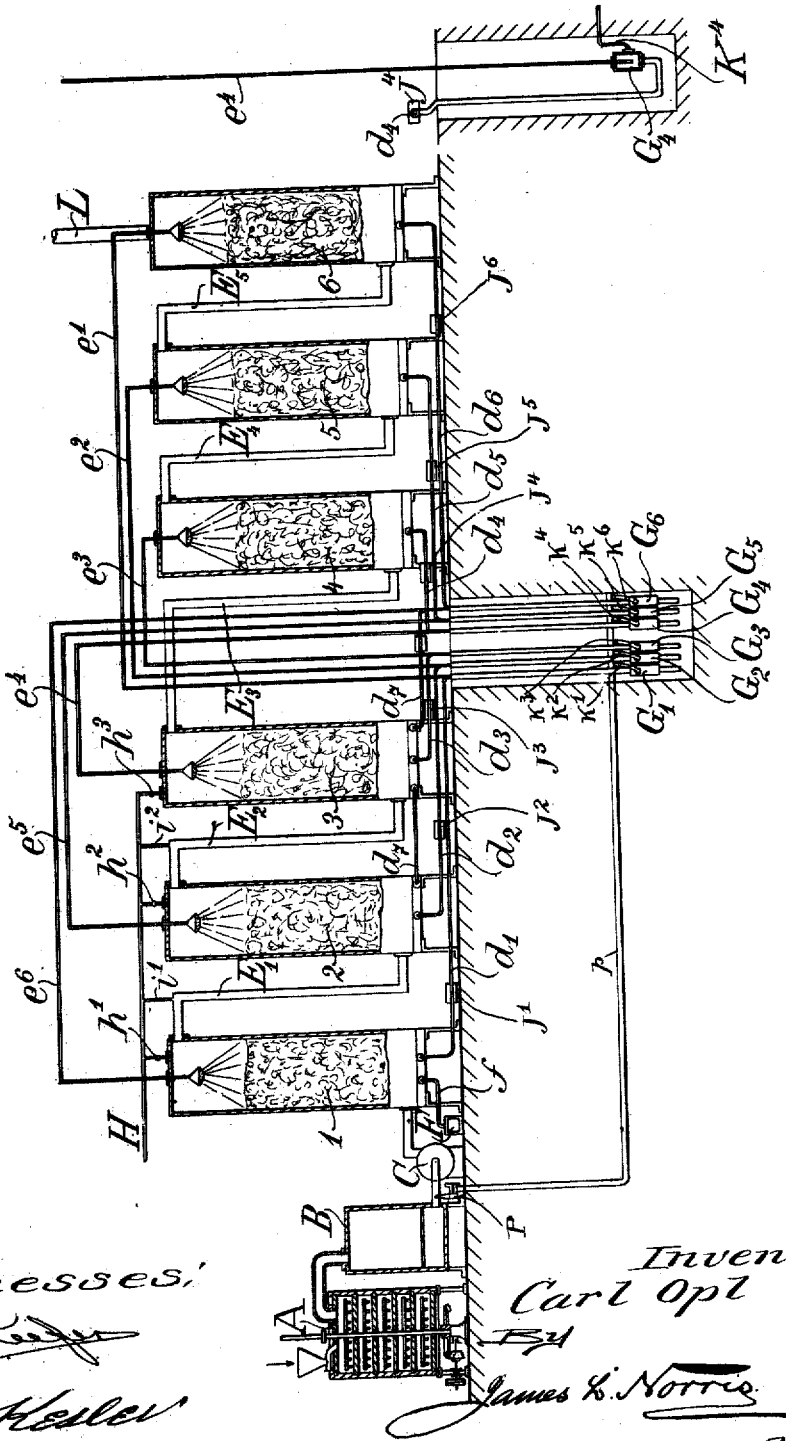

CARL OPL, OF HRUSCHAU, AUSTRIA-HUNGARY, ASSIGNOR TO THE FIRM OF ERSTE OESTERREICHISCHE SODAFABRIK, OF HRUSCHAU, AUSTRIA-HUNGARY.

MANUFACTURE OF SULFURIC ACID.

1,012,421.  Specification of Letters Patent.  Patented Dec. 19, 1911.

Application filed February 4, 1909. Serial No. 476,018.

*To all whom it may concern:*

Be it known that I, CARL OPL, subject of the Emperor of Austria, residing at Hruschau, in Silesia, Austria-Hungary, have invented certain new and useful Improvements in the Manufacture of Sulfuric Acid, of which the following is a specification.

The present invention relates to improvements in the art of manufacturing sulfuric acid and more particularly to the process wherein the use of lead chambers is avoided and the pyrite burner gases containing sulfur dioxid are passed through absorption towers sprayed with nitrous sulfuric acid, and the object of the present invention is to enable sulfuric acid to be manufactured more rapidly by the above-mentioned process by providing for a more rapid circulation of the nitrous sulfuric acid whereby a quicker and more complete oxidation of the burner gases is effected, this result being attained according to the present invention by causing the acid eggs which serve to raise the nitrous sulfuric acid up to the towers to be actuated partially by compressed burner gases and partially by compressed air. These burner gases which aid in the operation of the acid eggs are also oxidized by the mixing thereof with the nitrous sulfuric acid, and the yield of sulfuric acid is thereby increased. The acid eggs may also convey to the respective towers such water as is necessary or required during the operation as well as the nitric acid.

In carrying the process into practical operation, four to six towers may be connected together and worked systematically in such a way that the towers toward the end which first receive the burner gases also receive the nitrous sulfuric acid produced in the towers farther removed from such end of the system, while a portion of the sulfuric acid produced in those towers near the end which first receives the burner gases is supplied to the towers toward the opposite end of the system for the purpose of absorbing the nitrogen oxids liberated during the production of the sulfuric acid. For example, assume that six towers are connected together, the first tower into which the hot burner gases are delivered receiving the nitrous sulfuric acid produced in the remaining towers of the system and denitrifies it and also gives up a part of the sulfuric acid produced therein to the sixth tower of the system; the second tower of the system receives the nitrous sulfuric acid from the fifth tower of the system and gives up a part of the sulfuric acid produced therein to the fifth tower, and in a similar way the third and fourth towers operate together. In operating systems wherein the number of towers varies, the connections between the towers may be similarly arranged. For example, if five towers are employed, the first tower of the system which receives directly the hot burner gases also receives acid produced by the remaining towers of the system, and the first tower gives up acid to the fifth tower of the system; the second tower receives acid from and gives up acid to the fourth tower of the system, while the third or middle tower operates alone.

In order to insure safety in the operation of the system or to utilize the heat developed in the burning process, a concentration tower for producing sulfuric acid of 66° Baumé may be inserted at the beginning of the system.

The present invention provides an improved method and apparatus for the manufacture of sulfuric acid in reaction towers sprayed with nitrous sulfuric acid whereby such process can be carried on commercially and the increased capacity of a given system results in a yield of about ten times as much sulfuric acid for a given reaction space as obtained with a lead chamber system.

In the accompanying drawing: Figure 1 is a diagrammatic view of a system capable of carrying out my present invention; and Fig. 2 is a detail view of one of the acid eggs and its connections.

Referring to the drawing in detail, A represents diagrammatically a pyrite burner, B a dust filter, C represents a fan or blower for producing a draft of the gases through the entire plant or system, and 1 to 6 designate the reaction towers. The pyrite burner is connected to deliver the gases into the top of the filter B while the fan or blower receives the gas after filtering and forces it into the bottom of the first tower of the system. The several towers of the system are connected to one another in series by means of the conduits E to $E_5$. The first tower 1 of the system operates as a Glover tower, that is to say, it concentrates the acid which is formed in the remaining towers of the system to 66° B. and delivers a part of the acid so concentrated into the tank F through the conduit (f) while the remainder of the acid so concentrated flows through the conduit $d_1$ thence into the acid egg $G_1$. From the acid egg the acid flows through the conduit $e^1$, and is finally atomized or sprayed in the upper part of the tower 6.

The second tower 2 of the system receives nitrous sulfuric acid from tower 5 through the conduit $d^5$, the acid egg $G^5$ and the conduit $e^5$. Tower 2 partially denitrifies the acid and the same is then conveyed through the conduit $d_2$, the acid egg $G_2$ and the conduit $e^2$ to tower 5 wherein such acid is sprayed or atomized.

Tower 3 receives nitrous sulfuric acid from tower 4 through the conduit $d_4$, the acid egg $G_4$ and the conduit $e^4$, and from the latter the acid is sprayed into the top of tower 3 which tower partially denitrifies the acid and then discharges the same through a conduit $d_3$ from which the acid flows into the acid egg $G_3$ and through the conduit $e^3$ and is sprayed or atomized in the top of tower 4.

Such water as may be necessary during the operation of the system is supplied through a conduit H which has branch pipes $h^1$, $h^2$ and $h^3$ for feeding water into the towers 1, 2 and 3, and the conduit H also has branches $i_1$ and $i_2$ for feeding water into the connecting pipes $E_1$ and $E_2$.

The waste gases from the end of the system are discharged through a pipe L leading from tower 6.

$J'$—$J^8$ represent lead boxes connected with the conduits $d'$—$d^8$ respectively for introducing the acid coming from the reaction towers into the corresponding acid eggs, water and nitric acid being also fed into the acid eggs through the said lead boxes. The tubes $e'$—$e^6$ leading from the separate acid eggs $G'$—$G^6$ respectively serve to convey the acid mixture contained in the acid eggs up to the respective reaction towers and to allow the said mixture to reach the atomizers provided in the upper part of the reaction towers; the elevating or lifting of the acid mixture being effected by the pressure of the burner gases and air fed under pressure into the acid eggs by the pump P, the tube $p$ and the branch conduits $k'$—$k^6$. Fig. 2 of the drawings shows clearly the connection of one of the acid eggs $g^4$ with the corresponding pipe conduits.

According to the present invention, the acid is lifted into the towers not only by the compressed air, but also by the compressed burner gases. Practice has demonstrated that where the acid is lifted into the towers exclusively by compressed air, there is not a sufficiently intimate mixture of the burner gases with the nitrous sulfuric acid to insure a sufficiently rapid oxidation of such gases. Such disadvantage, however, is obviated by the present invention in that the acid eggs which serve to raise the nitrous sulfuric acid into the reaction towers are actuated partly by compressed burner gases and partly by compressed air. During this operation, a certain percentage of the burner gases to be converted into sulfuric acid is driven under pressure into the acid eggs which serve to raise the acid instead of being conveyed in the usual manner directly into the reaction towers. This part of the burner gases which is driven under pressure into the acid eggs will naturally become intimately mixed with the nitrous sulfuric acid and will therefore become rapidly oxidized with the result that there is a great increase in the yield of sulfuric acid.

I claim as my invention:

1. The herein described improvement in the art of manufacturing sulfuric acid without lead chambers, which consists in passing the burner gases containing sulfur dioxid under pressure into a system of reaction towers and producing a rapid circulation of nitrous sulfuric acid through the system by feeding compressed burner gases and compressed air to the acid eggs to raise the nitrous sulfuric acid into the towers and to come into intimate contact with the said acid, whereby oxidation of the burner gases is effected.

2. The herein described improvement in the art of manufacturing sulfuric acid without lead chambers, which consists in passing burner gases containing sulfur dioxid through a system of reaction towers, raising nitrous sulfuric acid by acid eggs and atomizing such acid within the reaction towers, and conveying a part of the burner gases under pressure and also compressed air to the acid eggs and causing such burner gases to assist in the raising of the nitrous sulfuric acid, and also to mix intimately with such nitrous sulfuric acid whereby such gases are oxidized.

In testimony whereof I have hereunto set my hand in presence of two subscribing witnesses.

CARL OPL.

Witnesses:
Josef Rubuschki,
Robert W. Heingartner.